Sept. 10, 1957  G. K. C. HARDESTY  2,805,505
ILLUMINATED PANEL—UNINTERRUPTED TRANSLUCENT LAMINATION
Filed July 26, 1956
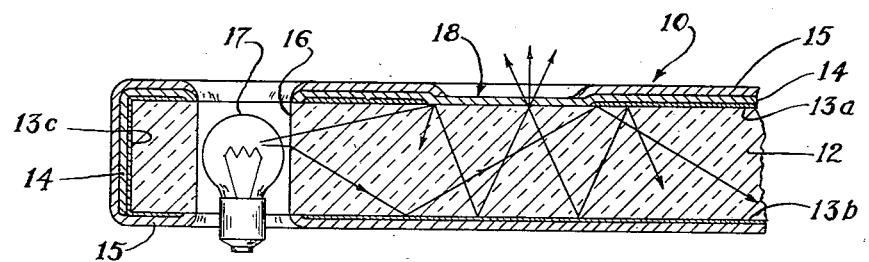
INVENTOR
George K. C. Hardesty
BY George Sipkin
B. L. Zanquill
ATTORNEYS

United States Patent Office 2,805,505
Patented Sept. 10, 1957

2,805,505

ILLUMINATED PANEL-UNINTERRUPTED TRANSLUCENT LAMINATION

George K. C. Hardesty, Anne Arundel County, Md.

Application July 26, 1956, Serial No. 600,355

10 Claims. (Cl. 40—130)

(Granted under Title 35, U. S. Code (1952), sec. 266)

The invention described herein may be manufactured and used by or for the Government of the United States of America for governmental purposes without the payment of any royalties thereon or therefor.

This application is a continuation-in-part of applicant's copending application Serial No. 564,090, filed February 2, 1956, for Laminated Metal-Plastic Illuminable Panels.

The present invention relates to the illumination of instrument dials and panels, and, more particularly, to the provision of an efficient edge-illuminated panel which is suited for many uses aboard ships and aircraft, and in other installations having a large number of visual indicators.

For military applications, the interest seems to lie almost entirely in the edge illumination of transparent plastics. However, most of the edge-illuminated structures are inefficient. The degree of efficiency varies widely; and, in some applications, only the most efficient are of any practical value. In some applications, such as in the illuminated control panels of aircraft, there has been much patience with the inherent limitations or rather the inherent inefficiencies of the structures that have been developed, and the designer can utilize such structures only by using a large number of lamps per unit of illuminated panel area.

In applicant's copending application, Serial No. 369,976, filed July 23, 1953, for Duo-Panel Edge Illumination System, there is described an invention which has for its object the provision of an improved panel edge illumination system that is particularly suitable in locations in which the preservation of a high degree of dark adaptation of personnel is required. In that application there is described a system which operates on the principle of transmission of light through a transparent plastic sheet by total internal reflection to a second indicia-bearing sheet which is in poor optical contact with the surfaces of the first sheet. This provides an extremely efficient system since little or no light is lost. While the duo-panel system disclosed in applicant's copending application is extremely efficient, the illuminating field is broad, and in some installations for one reason or another, such as cost of fabrication, need for relatively low first cost or the like, the duo-panel system would not be the optimum choice and there was need for alternate means for illuminating instrument panels.

In applicant's copending application Serial No. 564,090, referred to above, there is provided an improved panel illumination system wherein polished, metallic surfaces are optically bonded to the surfaces of an edge-illuminable plastic sheet or panel and light is transmitted by reflection between the polished metallic boundaries thus formed. This is in direct contradistinction to the principle of providing poor optical contact and thereby obtaining total internal reflection described in applicant's other copending application. However, while the coefficient of reflection of a polished metallic surface may be much less than that of total internal reflection, it is nearly the same for any angle of incidence. Accordingly, provision was made for salvaging, collimating and reflecting to the object to be illuminated, light rays having an angle of direction greater than the complement of the critical angle of the transmitting medium. The combined effect of this is to increase the total solid angle of light that may be utilized thereby increasing the efficiency of the new system.

It will be noted that there is a similarity between applicant's two prior cases in that the light transmission is in both instances by specular reflection. However, there is a difference in that the specular reflection in the latter instance is the phenomenon of light reflection from a polished metallic surface; while, in the former the reflection is that termed "total internal reflection" and is a phenomenon associated with the difference between the indices of refraction of two transparent media separated by a common interface. At first this may not seem too significant a difference; but as conditions in illuminable panels, they are mutually exclusive.

The instant invention follows the phenomenon of light reflection of polished metallic surfaces, of applicant's above copending application Serial No. 564,090, while incorporating therewith certain desirable features of applicant's copending application Serial No. 369,976.

A general object of the present invention is the provision of an improved panel illumination system.

Another object of this invention is to enhance the brightness of indicia or other markings on an illuminated panel.

A further object of this invention is to control the brightness of indicia or other markings on an illuminated panel.

A still further object of this invention is to seal the metallic coating of an illuminated panel from exposure to salt sprays, corrosive atmospheres or the like.

Other objects and many of the attendant advantages of the invention will be readily appreciated as the same becomes better understood by reference to the following detailed description when considered in connection with the accompanying drawing, wherein the single figure shows a fragmentary section through an illuminated panel illustrating a preferred embodiment of the invention.

Referring now to the drawing wherein for purposes of illustration the invention is shown applied to a fragment of an edge-illuminated panel particularly adapted for use aboard ships, aircraft or the like. The structure designated generally by reference numeral 10 includes a panel or light transmitting member 12 made of a highly transparent plastic. The light transmitting panel comprises a relatively large flat highly transparent plate, having its front and back surfaces in parallel relation to each other and preferably polished to provide smooth optical surfaces. The light transmitting member is preferably fabricated from an acrylic resin or methyl methacrylate plastic material of the thermoplastic type such as, for example, commercial "Plexiglas" or "Lucite." The boundry surfaces of panel 12, including the major front, back and outer edge surfaces are covered with a material having high specular reflectivity. This material may be polished-faced metal foil, polished metal sheets, evaporated metal deposited on the surfaces as a film, or oriented flake metallic pigmented coatings.

The polished material, hereinafter referred to as metal foil, on the upper surface, the surface nearest to the viewer, is indicated at 13a, that on the back or lower surface is indicated at 13b, and that on the edges at 13c. Lamination 13b and overlying laminations may be omitted from the back surface in some instances and reliance placed on this boundary's property of total internal reflection to contribute to the transmission of light rays through the transparent panel 12, as described hereinafter. A translucent coating or lamination 14, preferably white, is placed over the metal foil, while an opaque coating 15, preferably black, is superimposed on the translucent coating 14. As shown in the drawing, except for certain openings as pointed out hereinafter, the light transmitting panel is enveloped in its entirety first by the metallic reflective laminations, then partially by the translucent laminations, and finally in its entirety by the opaque laminations. Thus light is conserved and the metallic laminations are sealed against corrosion. In some installations, as where it is desirable that there be no daylight contrast between the indicia and the rest of the viewed face, and to provide for the indicia to be visible only when the panel is illuminated, the opaque lamination 15 may be omitted from the viewed face or such lamination may be of a material having the same daylight appearance as that of the indicia.

One corner of the transparent panel 12 is formed with an opening 16 in which is located a miniature electric lamp 17, connected by suitable means, not shown, to a source of electric current. While but one lamp is shown, a plurality of such lamps, depending upon the size and use of the panel, may be suitably placed within openings in the panel. If desired, a filter cap, not shown, to provide only red light energy may be placed over the lamp 17. In some instances, it may be desirable to place one or more electric lamps along the outer edge of the panel, rather than in openings within the panel as shown, in which case the laminations are omitted from such edge portions of the panel.

As shown in the drawing, an indicium, indicated generally by reference numeral 18, is provided in the upper or obverse surface of the panel. Any number of such indicia, depending upon the need, may be used. The indicium is formed by providing an opening of predetermined size and shape in the metallic reflective lamination 13a, then the translucent lamination 14 is applied with an integral portion thereof fitting in the opening in direct optical contact with the upper face of the light-transmitting panel 12, then the opaque lamination 15 is applied preferably with an opening therein of smaller size than the opening in the metallic lamination 13a. In other words, the area of optical contact of the translucent lamination with the light-transmitting panel is preferably larger than the area of the opening in the opaque lamination, with the result that brightness of the marking is enhanced.

With this structure, indicium 18 will be rendered luminous by diffused transmission of any light ray striking the rear surface of lamination 14 where it comes in optical contact with light-transmitting panel 12. It is further illuminated by those components of the diffusely, internally reflected light which pass to the opposite mirrored surface 13b and are reflected back again to the optical contact area at the indicium. Because of this reflex-like function, the brightness of the illumination of indicium 18 is partially a function of area; and, in fact, the area of optical contact may be made considerably larger than the area which is presented to the observer, with the result that the brightness of the marking is enhanced.

Thus, in accordance with this invention, a structure is provided in which the translucent indicia are an integral part of a substantially uninterrupted, imperforate translucent lamination which may be a coating of paint or lacquer-like material or may be a thin lamination of a translucent plastic material. In either case, the translucent material is placed in optical contact with the light-conducting panel at local zones, preferably larger in area than individual indicia or groups of indicia that it is desired to illuminate from the panel lamps. Where it is desired that the indicia be illuminable from the panel lamps, the indicia are placed in juxtaposition to the optical contact areas. As shown in the drawing, the translucent coating does not contact the light-transmitting panel at areas other than those in juxtaposition to indicia which are to be illuminated. An exception occurs at panel edges or at the periphery of openings in the panel. Here, the purpose is to seal the metallic coating from exposure to salt spray, corrosive atmospheres or the like. As is desirable in some instances, certain indicia such as those giving the manufacturer's name may be made legible by daylight but nonilluminable and removed from view at night simply by not providing an open area in the metallic coating under the translucent coating and thus avoiding local optical contact with the clear plastic, light-transmitting panel.

It should further be noted that, in the structure disclosed, the illumination of an indicia is only in part the result of primary light rays striking directly on the rear of the indicia. By virtue of re-reflected rays, the area of translucent lamination surrounding the indicia contributes greatly to the illumination of the indicia. This follows since this area is in optical contact with the light-transmitting panel and therefore virtually becomes a luminous source. A significant part of the light from this virtual source is reflected by the specular interface between panel 12 and metallic lamination 13b back to the rear of the indicia. Thus, by selection of the size and shape of areas near the indicia, considerable control of the brightness of indicia may be obtained without any special localized processing of the rear surface of the illuminable panel.

In some instances it may be desirable to tone down the brightness of certain indicia relative to others, in which case certain openings in the first lamination may be of the same area or even of less area than the juxtaposed openings in the third lamination. In other instances, as where it is desirable that the indicia be of uniform brightness, the indicia nearest the light source which otherwise may receive more light than those farther away are formed with smaller areas of optical contact with the light-transmitting panel than the more remote indicia; the area of the indicia-forming lamination in optical contact with the light-transmitting panel may vary directly with the distance from the light source with compatible variations in the openings in the opaque lamination.

Without further description, it is thought that the features and advantages of the invention will be readily apparent to those skilled in the art to which this invention appertains, and it will, of course, be understood that changes in form, proportions and minor details of construction may be resorted to without departing from the spirit of the invention and scope of the claims.

What is claimed is:

1. An illumination system comprising a light-transmitting panel of transparent material having a first lamination of high specular reflectance material bonded in optical contact on both front and back faces and edges thereof, a light source located within an opening within said panel for passage of light rays into and through said panel, the first lamination on the front face of said panel being interrupted at desired areas so as to provide openings for the transmission of light therethrough, a second lamination of translucent material superimposed upon the first lamination and having integral portions thereof in optical contact with the transparent panel through the openings in the front surface of the first lamination to thereby form indicia, and a third lamination of opaque material superimposed on said second lamination and having openings therein juxtaposed with the openings in the first lamination on the front face of the panel for exposing the indicia formed by said translucent lamination, and means formed in said translucent and said opaque laminations for enhancing the brightness of said indicia.

2. An illumination system as set forth in claim 1 wherein the means for enhancing the brightness of the indicia includes selection of the relative areas of the openings in the opaque lamination superimposed on the optically bonded areas of the translucent lamination within the openings in the lamination of specular reflectance material.

3. An illumination system as set forth in claim 1 wherein the means for enhancing the brightness of the indicia includes an area of the translucent lamination in optical contact with the light-transmitting panel that is larger than the area of a juxtaposed opening in the opaque lamination.

4. An illumination system as set forth in claim 1 wherein said translucent lamination and said opaque lamination cooperate with said lamination of specular reflectance material in sealing said last-named lamination in its entirety against ambient atmospheres.

5. An illumination system comprising a light-transmitting panel of transparent material having major front and back faces substantially in parallel planes, a first lamination of high specular reflectance material bonded in optical contact with at least the front face of said panel, a light source as positioned relative to said panel so to transmit light rays thereinto for passage therethrough, the first lamination on the front face of said panel being interrupted at desired areas thereof so as to provide openings for the transmission of light therethrough, a second lamination of translucent material superimposed on the first lamination and having integral portions thereof in optical contact with the transparent panel through the openings in the front surface of the first lamination to thereby form indicia, and a third lamination superimposed on said second lamination and having openings therein juxtaposed with the openings in the first lamination for exposing the indicia formed by said translucent lamination, and means formed in certain of said laminations for regulating the brightness of the indicia.

6. An illuminating system as set forth in claim 5 wherein the areas of the openings in the first lamination are different from the areas of the openings in the third lamination to thereby regulate the brightness of the indicia.

7. An illuminating system as set forth in claim 5 wherein the area of the openings in the first lamination are larger than the area of the openings in the third lamination to thereby enhance the brightness of the indicia.

8. An illuminating system as set forth in claim 5 wherein the openings in the third lamination are such as to expose to view sufficient of the translucent lamination as to render the indicia visible only by light from said light source.

9. An illuminating system as set forth in claim 5 wherein the material of the third lamination is substantially the same in daylight appearance as that of the second lamination to thereby render the indicia visible only by light from said light source.

10. An illuminating system as set forth in claim 5 wherein said first lamination is enveloped in its entirety by said second and third laminations to thereby seal said first lamination against corrosive atmospheres.

No references cited.